Sept. 12, 1961  J. ULDERUP ET AL  2,999,679
SPRING MOUNT

Filed April 12, 1957  2 Sheets-Sheet 1

INVENTOR
Jürgen Ulderup and
Franz Gottfried Reuter
By Clelle W. Upchurch
ATTORNEY

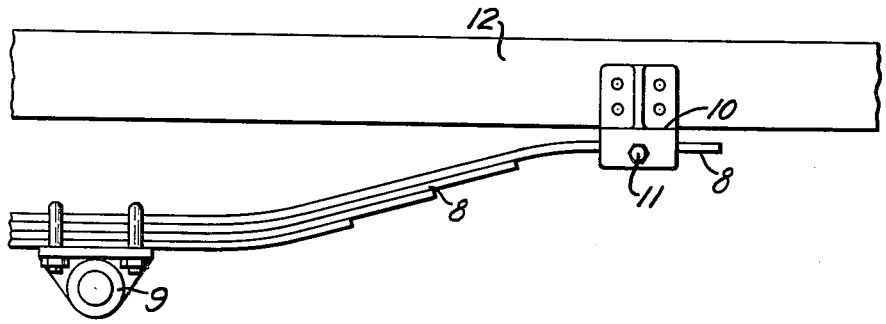
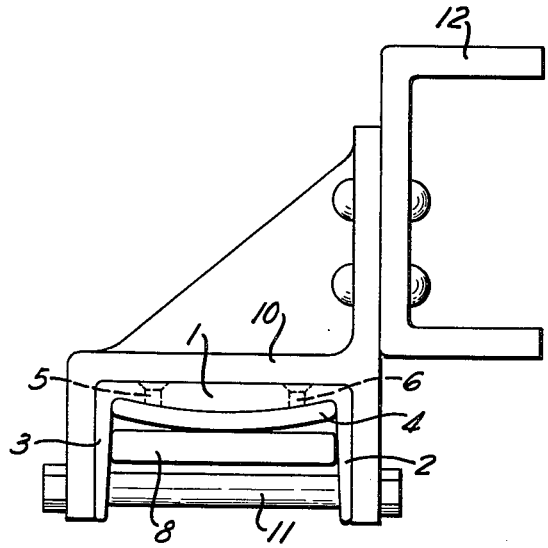

United States Patent Office

2,999,679
Patented Sept. 12, 1961

2,999,679
SPRING MOUNT
Jürgen Ulderup and Franz Gottfried Reuter, Lemforde, Hannover, Germany, assignors, by mesne assignments, to Mobay Chemical Company, Pittsburgh, Pa., a corporation of Delaware
Filed Apr. 12, 1957, Ser. No. 652,571
Claims priority, application Germany Apr. 17, 1956
4 Claims. (Cl. 267—49)

This invention relates to spring mounts that can be used to guide the ends of the leaf springs of heavy vehicles and to a process for making the same.

The conventional leaf spring used in vehicles of various types is ordinarily securely attached at each end to the vehicle frame but forms a sliding fit between members of a support attached to the frame at least at one end. Some means must be provided for permitting changes in length of the spring as the load thereon and the amount of compression changes, so the spring is supported against the frame in such a manner that the end thereof can slide as the spring length changes. As the amount of compression changes and the end of the spring slides through the spring mount, its surfaces rub against the surface of the spring mount.

It is known to use spring mounts having the shape of a flanged shoe to guide the ends of the leaf springs of heavy vehicles. For the purpose of preventing noise, spring mounts of this type have heretofore been made of rubber. Thus, good damping is obtained but the rubber parts are subject to a rather rapid wear and tear due to abrasion.

Figure 1:
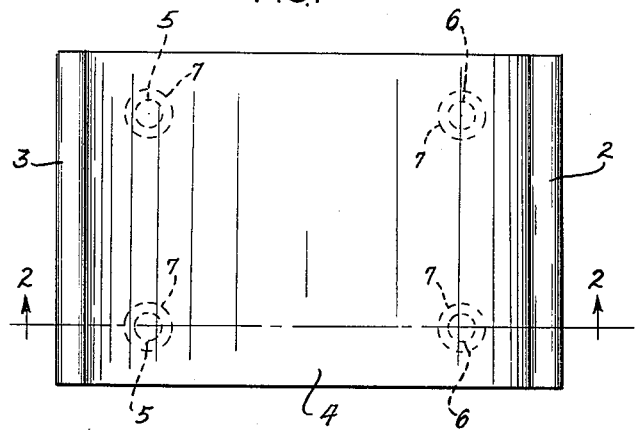
Figure 2:
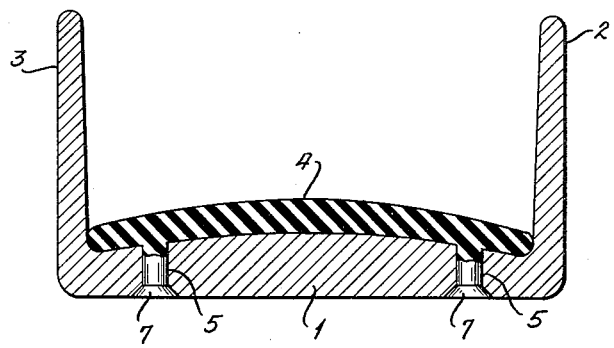

It is, therefore, an object of the present invention to provide spring mounts which combine good damping with high abrasion resistance and yet can be produced at a reasonable price. A further object is to provide a simple and economical process for making these spring mounts. Still further objects will become apparent from the following description with reference to the accompanying diagrammatical drawing in which FIGURE 1 is a top view of a spring mount in accordance with this invention, FIGURE 2 is a sectional view taken on line 2—2 of FIGURE 1, FIGURE 3 is a side elevation view of part of a vehicle having spring suspension, and FIGURE 4 is an end view of the part of the vehicle having spring suspension shown in FIGURE 3.

In accordance with this invention, generally speaking, the foregoing objects and others are accomplished by providing spring mounts which comprise a base made of an elastic material, such as rubber, and a layer of polyurethane rubber superposed on said base and adapted to receive the stress of the spring. In a preferred embodiment, the spring mounts of the instant invention have a base with retainer walls at right angles to said base for guiding the ends of a leaf spring, said base being made of an elastic material and having superposed thereon a layer of polyurethane rubber, said layer having projections extending through perforations in said base, said projections being flanged to lock the superposed layer to the base.

The base of the spring mounts of the invention may be made from any suitable elastic material including natural and synthetic rubber. The construction material for the superposed layer receiving the stress of the spring may be polyurethane rubber having a hardness of at least 70–100 Shore as prepared by reacting an organic diisocyanate with a substantially linear hydroxyl compound, such as a polyester of the alkyd type containing terminal hydroxyl groups, or a polyalkylene ether glycol.

Methods for producing polyurethane rubber are described in the literature, for example, in U.S. Patents 2,620,516; 2,621,166; 2,729,618; 2,778,810, the disclosure of which is incorporated herein by reference. A particularly high abrasion resistance is obtained if the superposed layer having slidable contact with the spring is made from a polyurethane rubber composition of the type disclosed and claimed in copending application Serial No. 565,555 filed February 15, 1956, now U.S. Patent 2,951,053. Such polyurethane rubber compositions comprise essentially a rubber-like polyurethane and, distributed in said rubber-like polyurethane, a solid inorganic lubricating agent and an organic compound having a boiling point above 200° C. which is non-compatible with said rubber-like polyurethane. While the inorganic lubricating agent contained in the rubber-like polyurethane is preferably molybdenum disulfide, the non-compatible compound is preferably a silicone oil and/or a hydrocarbon. Surfaces made of such polyurethane rubber compositions have improved friction characteristics and give the spring mounts of the invention the quality of a lubricated bearing with complete freedom from maintenance.

In order to firmly secure the superposed layer of polyurethane rubber to the base element, the layer is cast in one piece as a curved plate with a plurality of projections. These projections extend through perforations in the base and are widened on their ends like rivet heads.

Referring more particularly to the drawings, the spring mounts illustrated in FIGURES 1 and 2 comprise the slightly convex base plate 1 with the attached sides 2 and 3. The layer 4 with the projections 5 and 6 is made of polyurethane rubber containing small amounts of molybdenum disulfide, a silicone oil and kerosene. The projections 5 and 6 are flanged forming the rivet heads 7.

The dimensions of the spring mounts are: breadth about 100–300 mm., length about 300 mm., height about 5–10 mm. In FIGURES 3 and 4, the connection of the invention with the leaf spring 8 and a vehicle frame 12 is shown. In these drawings, the leaf spring 8 is attached to the vehicle axle through bracket 9 and rotatably fixed to the vehicle frame 12 at one end (not shown). The free end of leaf spring 8 supports the vehicle frame 12 through bracket 10 which holds base plate 1 in place. A bolt 11 prevents the leaf spring from coming out of the U-shaped base plate 1 when the leaf spring is not supporting the vehicle frame.

To produce the spring mounts of the invention, a liquid polyurethane composition capable of forming cast polyurethane rubber when cured is poured onto a base of an elastic material as illustrated in FIGURE 2. The liquid polyurethane composition flows into the perforations contained in the base. The pouring operation is discontinued when a layer of sufficient height has been formed. Now, the base containing the liquid mass is heated at a temperature of between 60° and 180° C. to thereby bring about curing and solidification with formation of polyurethane rubber. Methods for the preparation of cast polyurethane rubber via liquid polyurethane compositions are described in the above-cited U.S. patents.

As indicated above, a particularly desirable polyurethane rubber having improved friction characteristics may be obtained by the process of copending application Serial No. 565,555 filed February 15, 1956, now U.S. Patent 2,951,053. In a specific embodiment, this process involves reacting an organic diisocyanate, such as 1,5-naphthylene diisocyanate, with a substantially linear hydroxyl polyester of the alkyd type to form an isocyanate-modified polyester containing free NCO groups. This reaction is preferably carried out at temperatures of 80° and 180° C. and the diisocyanate is used in an excess of 20% to 250% over the amount required for reaction with the hydroxyl groups of the hydroxyl polyester. The isocyanate-modified polyester thus prepared is then cross-linked by the addition of a bifunctional chain extender, such as a glycol or a diamine. The cross-linking is generally effected by heating the mixture of isocyanate-modified polyester and cross-linking agent to a temperature within the range of 60° to 180° C. using the cross-linking agent (chain extender) in an amount insufficient to react with all free NCO groups contained in the isocyanate-modified polyester. A small amount of an acid, such as hydrogen chloride, may be dissolved in the cross-linking agent in order to adjust the cross-linking time which otherwise might be too short. Prior to the reaction with the organic diisocyanate, the substantially linear hydroxyl polyester serving as the starting material is mixed with about 0.1 to 1% by weight of molybdenum disulfide, 0.01 to 5% by weight of a silicone oil and 0.01 to 5% by weight of a solid paraffin hydrocarbon, said percentages being based on the weight of said hydroxyl polyester.

The spring mounts of the invention have a service life which is several times as long as that of conventional spring mounts consisting of rubber.

Although the invention is described in detail in the foregoing, modifications can be made by those skilled in the art without departing from the spirit and scope of the invention except as set forth in the claims.

*Example*

1,000 parts of a linear hydroxyl polyester obtained by thermal esterification of adipic acid with ethylene glycol and characterized by having a molecular weight of 2,000, an hydroxyl number of 50 and an acid number of 1 is heated at 135° C. in vacuo for 1 hour in order to completely remove the moisture contained therein. Then 3 parts of molybdenum disulfide, particle size 0.01 mm. (in diameter), 3 parts of a dimethylsiloxane polymer with a viscosity of 140 centistokes/20° C. and 2 parts of solid paraffin are added. Subsequently, 300 parts of naphthylene-1,5-diisocyanate are introduced into the mixture. The components are allowed to react for 10 minutes in vacuo. Thereupon, 70 parts of 1,4-butanediol containing 1% of dry hydrogen chloride are added within 1 minute to the melt with vigorous stirring. The resulting product is poured into heated molds for the spring mount where it is maintained for 24 hours at 110° C. to produce a cured rubber-like material. The elastomer thus obtained is black and distinguished by the particular properties of its surface.

What is claimed is:

1. A spring mount comprising, in combination, a base made of rubber, said base having perforations therein, and adapted to guide a leaf spring and a layer of rubber-like polyurethane superposed on said base and attached thereto through a plurality of projections which are integral with said rubber-like polyurethane and project into said perforations in said base to lock the rubber-like polyurethane thereto.

2. A spring mount having a base with retainer walls substantially at right angles to said base for guiding the ends of a leaf spring, said base being made of rubber and having superposed thereon a layer of rubber-like polyurethane having distributed therein a solid inorganic lubricating agent and an organic compound having a boiling point above about 200° C. which is noncompatible with said rubber-like polyurethane, said rubber-like polyurethane layer having projections extending through perforations in said base, said projections being flanged to lock the superposed layer to the base.

3. A spring mount having a base with retainer walls substantially at right angles to said base for guiding the ends of a leaf spring, said base being made of rubber and having superposed thereon a layer of rubber-like polyurethane having distributed therein small amounts of molybdenum disulfide, a silicone oil and a hydrobarbon with said rubber-like polyurethane, said rubber-like polyurethane layer having projections extending through perforations in said base, said projections being flanged to lock the superposed layer to the base.

4. A spring mount comprising, in combination, a base made of rubber, said base having perforations therein, and adapted to guide a leaf spring and a layer of rubber-like polyurethane having a Shore hardness of about 70 to about 100 superposed on said base and attached thereto through a plurality of projections which are integral with said rubber-like polyurethane and project into said perforations in said base to lock the rubber-like polyurethane thereto.

References Cited in the file of this patent

UNITED STATES PATENTS

| | | |
|---|---|---|
| 1,691,185 | Goode | Nov. 13, 1928 |
| 2,027,483 | Keller | Jan. 14, 1936 |
| 2,402,528 | Bean | June 25, 1946 |
| 2,424,883 | Habgood | July 29, 1947 |
| 2,609,570 | Danielson et al. | Sept. 9, 1952 |
| 2,770,612 | Schollenberger | Nov. 13, 1956 |
| 2,776,135 | Assmus | Jan. 1, 1957 |